(12) United States Patent
Boettcher

(10) Patent No.: US 11,200,175 B2
(45) Date of Patent: Dec. 14, 2021

(54) MEMORY ACCESSOR INVAILIDATION

(71) Applicant: Arm Limited, Cambridge (GB)

(72) Inventor: Matthias Lothar Boettcher, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/825,021

(22) Filed: Mar. 20, 2020

(65) Prior Publication Data

US 2021/0294748 A1 Sep. 23, 2021

(51) Int. Cl.
*G06F 12/0891* (2016.01)
*G06F 12/1027* (2016.01)
*G06F 9/30* (2018.01)
*G06F 12/02* (2006.01)
*G06F 12/0864* (2016.01)
*G06F 12/14* (2006.01)

(52) U.S. Cl.
CPC ...... *G06F 12/0891* (2013.01); *G06F 9/30018* (2013.01); *G06F 12/023* (2013.01); *G06F 12/0864* (2013.01); *G06F 12/1027* (2013.01); *G06F 12/1458* (2013.01)

(58) Field of Classification Search
CPC .............. G06F 12/023; G06F 12/0864; G06F 12/0891; G06F 12/1027; G06F 12/1458; G06F 9/30018
See application file for complete search history.

(56) References Cited

U.S. PATENT DOCUMENTS

| 9,772,943 | B1 | 9/2017 | Mukherjee | |
|---|---|---|---|---|
| 2015/0242319 | A1* | 8/2015 | Evans | G06F 12/109 711/207 |
| 2017/0308316 | A1* | 10/2017 | Yamamoto | G06F 3/0604 |

FOREIGN PATENT DOCUMENTS

| GB | 2562062 | 11/2018 |
|---|---|---|
| GB | 2565069 | 2/2019 |
| WO | 2019/159472 | 8/2019 |

OTHER PUBLICATIONS

Xia et al., "CHERIvoke: Characterising Pointer Revocation using CHERI Capabilities for Temporal Memory Safety", MICRO-52, Oct. 12-16, 2019, 14 pages.
(Continued)

*Primary Examiner* — Aracelis Ruiz
(74) *Attorney, Agent, or Firm* — Nixon & Vanderhye P.C.

(57) ABSTRACT

There is provided a data processing apparatus that includes memory circuitry that provides a physical address space, which is logically divided into a plurality of memory segments and stores a plurality of accessors with associated validity indicators. Each of the accessors controls access to a region of the physical address space in dependence on at least its associated validity indicator. Tracking circuitry tracks which of the memory segments contain the accessors and invalidation circuitry responds to a request to invalidate an accessor by determining a set of equivalent accessors with reference to the tracking circuitry, and invalidating the accessor and the equivalent accessors by setting the associated validity indicator of each of the accessor and the equivalent accessors to indicate that the accessor and the equivalent accessors are invalid.

20 Claims, 8 Drawing Sheets

(56) References Cited

OTHER PUBLICATIONS

Watson et al., "Capability Hardware Enhanced RISC Instructions: CHERI Instruction-Set Architecture (Version 7)," Technical Report—University of Cambridge Computer Laboratory, No. 927, Jun. 2019, 496 pages.
Robert Bedichek, "Some Efficient Architecture Simulation Techniques," Proceedings of the Winter 1990 USENIX Conference, Jan. 22-26, 1990, 12 pages.
International Search Report and Written Opinion of the International Searching Authority for PCT/GB2021/050044 dated Apr. 14, 2021, 16 pages.
Arm Limited "ARM® System Memory Management Unit Architecture Specification, SMMU architecture version 3.0 and version 3.1" ARM IHI 0070A, 2016, 443 pages.

\* cited by examiner

Compartment A (victim):
  C1 = malloc(shared0)
  call B (C1)
    Compartment B (attacker):
    Store C1 to heap
    service call as expected
  free(C1)
  C2 = malloc(secret)
  C3 = malloc(shared1)
  call B(C3)
    Compartment B (attacker):
    Use C1 to access secret

MEMORY ACCESSOR INVAILIDATION

This invention was made with Government support under Contract Number HR001118C0016 awarded by the Defense Advanced Research Projects Agency (DARPA). The Government has certain rights in this invention.

The present technique relates to data processing. In particular, the present technique has relevance to memory systems.

In a data processing system, memory accessors can be used to control access to particular areas of memory. Such accessors can include both a reference to memory, and access restrictions so that the memory reference can only be used in a designated manner. In due course, the accessor might be invalidated. However, if the accessor has been copied, then it is important for copies of that accessor to also be invalidated. If this is not done, then the owner of those copies may be able to continue accessing the memory space, even if the memory space has been repurposed. However, scanning through memory to locate copies of the accessors can be very time consuming and/or resource intensive.

Viewed from a first example configuration, there is provided a data processing apparatus comprising: memory circuitry to provide a physical address space logically divided into a plurality of memory segments and to store a plurality of accessors with associated validity indicators, wherein each of the accessors controls access to a region of the physical address space in dependence on at least its associated validity indicator; tracking circuitry to track which of the memory segments contain the accessors; and invalidation circuitry to respond to a request to invalidate an accessor by determining a set of equivalent accessors with reference to the tracking circuitry, and to invalidate the accessor and the equivalent accessors by setting the associated validity indicator of each of the accessor and the equivalent accessors to indicate that the accessor and the equivalent accessors are invalid.

Viewed from a second example configuration, there is provided a data processing method comprising: logically dividing a physical address space of a memory into a plurality of memory segments; storing a plurality of accessors with associated validity indicators, wherein each of the accessors controls access to a region of the physical address space in dependence on at least its associated validity indicator; tracking which of the memory segments contain the accessors; responding to a request to invalidate an accessor by determining a set of equivalent accessors with reference to the tracking circuitry; and invalidating the accessor and the equivalent accessors by setting the associated validity indicator of each of the accessor and the equivalent accessors to indicate that the accessor and the equivalent accessors are invalid.

Viewed from a third example configuration, there is provided a computer program for controlling a host data processing apparatus to provide an instruction execution environment comprising: a plurality of data structures to store a plurality of accessors with associated validity indicators, wherein each of the accessors controls access to one of the data structures in dependence on at least its associated validity indicator; tracking program logic to track which of the data structures contain the accessors; and invalidation program logic to respond to a request to invalidate an accessor by determining a set of equivalent accessors with reference to the tracking program logic, and to invalidate the accessor and the equivalent accessors by setting the associated validity indicator of each of the accessor and the equivalent accessors to indicate that the accessor and the equivalent accessors are invalid.

The present technique will be described further, by way of example only, with reference to embodiments thereof as illustrated in the accompanying drawings, in which.

Figure 1:
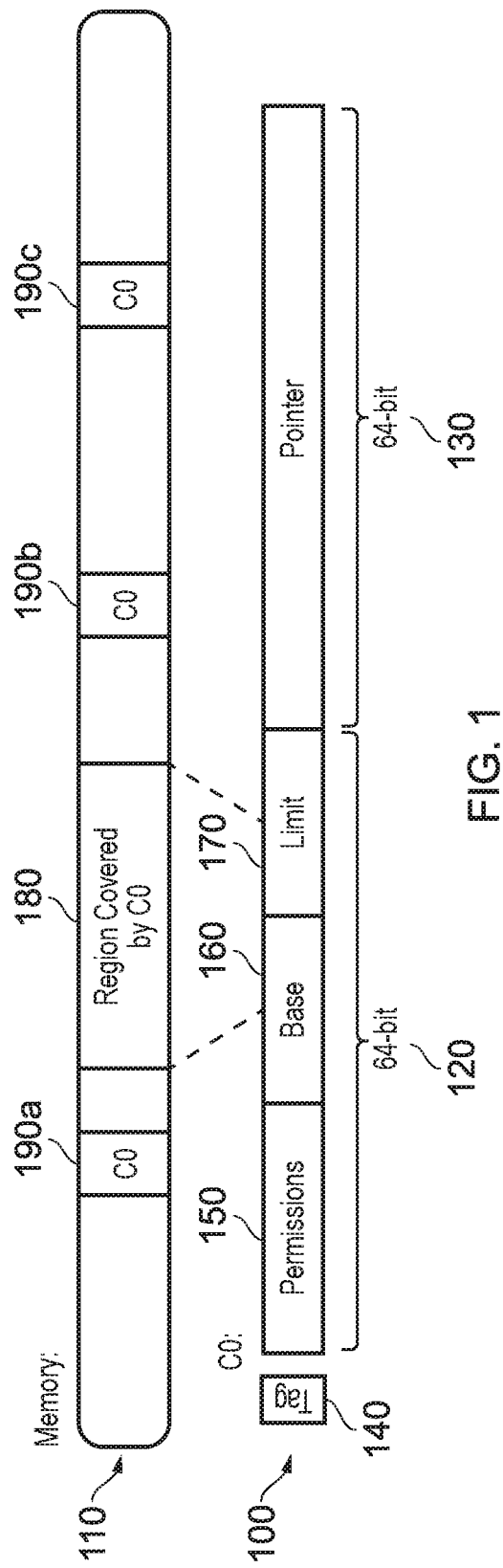
FIG. 1 illustrates an example of an accessor in accordance with some embodiments.

Before discussing the embodiments with reference to the accompanying figures, the following description of embodiments and associated advantages is provided.

In accordance with one example configuration there is provided a data processing apparatus comprising: memory circuitry to provide a physical address space logically divided into a plurality of memory segments and to store a plurality of accessors with associated validity indicators, wherein each of the accessors controls access to a region of the physical address space in dependence on at least its associated validity indicator; tracking circuitry to track which of the memory segments contain the accessors; and invalidation circuitry to respond to a request to invalidate an accessor by determining a set of equivalent accessors with reference to the tracking circuitry, and to invalidate the accessor and the equivalent accessors by setting the associated validity indicator of each of the accessor and the equivalent accessors to indicate that the accessor and the equivalent accessors are invalid.

The memory provides a physical address space (which is used to address a specific storage cell of the memory). This address space is divided into a number of memory segments. Note that the address space need not be exactly divided into the memory segments—there may be areas of the address space that fall outside the plurality of memory segments. The memory segments could be of different sizes and can be arbitrarily chosen, e.g. by software. The accessors are used to access areas of the address space. The accessors could, for instance, take the form of data structures that include a reference to a location in the address space together with one or more restrictions on how the reference can be used, and a validity indicator to indicate that the accessor is valid (e.g. uncorrupted). The accessors can be stored within the memory, e.g. within the memory segments and the tracking circuitry is able to determine which segments of physical memory contain accessors. Consequently, when an invalidation request is received to indicate that an accessor (and the memory to which it refers) is no longer to be used, the tracking circuitry can be consulted to determine any equivalent accessors in the memory. In this way, the accessor and those accessors that are considered to be equivalent are invalidated. Thus, it is possible to inhibit or prevent copies of an accessor from being kept in a valid state when a copy of that accessor is invalidated. This therefore prevents malicious or badly formed sections of code (such as untrusted libraries) from gaining access to secret information stored in memory that has been invalidated and then repurposed. Note that although the accessors are said to control access to memory regions, they do not exclusively control access to each memory region. In particular, there could be multiple accessors directed towards the same region of memory, or to overlapping areas of memory. Furthermore, there could be other circuits or mechanisms in place that override access that is granted by the accessors.

There are a number of ways of determining whether an accessor is an equivalent accessor to the one that is being invalidated. However, in some examples, the equivalent accessors comprise those of the accessors that control access to the region of the address space. In these examples, an accessor is considered to be equivalent if it controls access to the same region of the physical address space that the accessor being invalidated controls access to. Accordingly, it is possible to invalidate those accessors that would grant access to the same region of the address space that is being invalidated. Consequently, if this area of memory is then reused, then those accessors cannot be used to access any contents stored to that area of the address space.

In some examples, the accessor comprises a pointer. A pointer can be considered to be a reference to a location in memory where further data can be stored. The accessor may therefore comprise a pointer, which serves to reference, for instance a byte within one of the memory segments.

In some examples, the accessor comprises bounds information that defines the region of the physical address space that the pointer can be used to access. By providing bounds information, it is possible to prevent the pointer from being used to access a location that falls outside the bounds. For instance, if the bounds define a lower address limit of 1000 and an upper address limit of 2000, and if the pointer P points to an address 1999, then the accessor prevents the pointer from being used to access an address equal to the P+5, since this result (2004) would fall outside of the range 1000 to 2000. The bounds information can be defined in a number of ways. For instance, the bounds information could include a lower limit and an upper limit as previously described. In other examples, the bounds information may include a lower limit and an offset, which can be used to determine the upper limit by adding the offset to the lower limit. In other examples, an upper limit may be provided and an offset used to define a lower limit. In other examples, two offsets relative to the pointer may be provided to describe the lower and upper limit. In still other examples, the bounds information could be used to define a location to which access is prohibited, with all other memory locations being defined as being accessible via the pointer. Other techniques will be apparent to the skilled person from the previous description. Note that the accessor is not limited to only containing bounds information. In some examples, the accessor may also include permission information that controls the manner in which the pointer can be used to access the address space. For instance, in some examples, the accessor may be used to limit the pointer to being used for read operations.

In some examples, the equivalent accessors comprise those of the accessors where the bounds information matches that of the accessor. Another manner of determining whether an accessor is considered to be equivalent to an accessor that is being invalidated is by considering the bounds information. For instance, two accessors may be considered to be equivalent if the bounds information is a match between those accessors. Note that such a test may include or exclude matching of the permissions. For instance, two accessors may be considered to be equivalent if, in addition, the permissions are a match, or if one set of permissions is a subset of the permissions of the accessor to be invalidated. In other examples, the permissions may not be considered when determining equivalence.

In some examples, the equivalent accessors comprise those of the accessors where the bounds information defines a sub-region of the region of the physical address space. In these examples, an exact match of the bounds information is not required. Instead, an accessor will be considered to be equivalent to an accessor that is being invalidated if the region defined by the accessor being considered is a sub-region of the region of the address space for the accessor that is being invalidated. It will be appreciated that if a region of the address space is to be invalidated, then any accessor that refers to a part of that address space will also be invalidated since the memory being referred to by that accessor will become invalid as a consequence of the broader invalidation occurring. For instance, an accessor that accesses memory locations 2 to 98 is considered to be equivalent to an accessor that defines a region of addresses 0 to 100.

There are a number of ways in which the tracking circuitry can track which memory segments contain accessors. However, in some examples the tracking circuitry is adapted to indicate whether each of the memory segments contains one of the accessors. Such tracking circuitry operates by indicating, for each of the memory segments that is tracked by the tracking circuitry, whether that memory segment contains an accessor. Such information can be determined at the time that an accessor is created or copied. If a dedicated instruction is used to create or copy accessors validly, then that instruction can be designed in such a way that invoking the instruction causes the tracking circuitry to be updated in order to indicate the location of accessors within the memory segments. It will be appreciated that such a technique could provide a trade off with respect to the size of each of the memory segments. In particular, if the tracking circuitry provides an indicator of whether each memory segment contains an accessor then less storage space would be required for the tracking circuitry if the number of memory segments is small. However, this provides less useful information, since it becomes more likely that the bigger memory segments will contain an accessor. Similarly, this more limited information makes it less feasible to locate the accessors more precisely.

In some examples, the tracking circuitry comprises a bit field comprising a plurality of bits; and the plurality of bits is adapted to indicate which of the memory segments contains one of the accessors. In these examples, a bit field is used to provide a plurality of bits. Subsets of bits (bit vectors) of the bit field are used to represent particular memory segments. Hence by considering each bit vector, it is possible to determine whether a particular memory segment contains an accessor. In a simple example, a single bit could be provided for each memory segment, which simply indicates whether that memory segment contains an accessor or not—a '1' in the bit field could be used to indicate that memory segment contains an accessor whilst a '0' can be used to indicate that memory segment does not contain an accessor. The reverse encoding is also possible. By using a bit field to store this information, the contents of each of the memory segments can be represented in a compact manner.

In some examples, the tracking circuitry comprises a hash table; and the hash table accepts, as an input, a hash of at least part of the accessor. The term "hash table" is used here to refer to a table in which the input and/or contents of the hash table are produced using a hash function. For instance, a lookup index could be produced for the table by performing a hash on an input value such that it is possible to directly access a particular index of the table rather than manually scanning through each entry of the table to find a particular entry. A hash function can be considered to be a function that translates an input from a large input domain to an output in a smaller output domain. The process need not be cryptographic (one-way). In these examples, at least part of the accessor (e.g. bounds information) is hashed in order to provide an input to the hash table. By using such a data structure, it is possible to not only determine whether a memory segment contains any accessor, but also whether a given memory segment or which memory segments might contain an accessor having the hashed input (e.g. having the same bounds information). This makes it possible to provide a more intelligent assessment of whether a given memory segment contains an accessor that is of interest. The input to the hash function can be based on those elements of the accessor that are considered to define equivalence between two accessors. For instance, if two accessors are considered to be equivalent if their bounds and privilege information match, then these can be provided as inputs to the hash so that the tracking circuitry is able to help identify memory segments that contain equivalent accessors.

In some examples, the tracking circuitry comprises a bloom filter. A bloom filter is a data structure that can be used to determine whether, in this case, an accessor having particular qualities falls within a given memory segment. Bloom filters are such that false positives are possible. In other words, the bloom filter may report that a given memory segment contains an equivalent accessor when one is not present. However, a false negative does not occur, which is to say that the bloom filter does not return an indication that no equivalent accessor exists in a memory segment when one is present. This is important for invalidation where although it is inconvenient to unnecessarily perform further analysis of a memory segment to search for an accessor, it is unsafe to not invalidate an equivalent accessor because one was not reported as being present. A bloom filter can be implemented using a bit field in which a number of bits correspond with one of the memory segments. The number of bits allocated to each memory segment decreases the likelihood of false positives at the cost of increased storage space.

In some examples, the invalidation circuitry is adapted, when the tracking circuitry indicates that a given memory segment contains one of the accessors, to perform a sweep of the given memory segment and rebuild an entry of the bloom filter that corresponds with the given memory segment. The tracking circuitry can be used in order to indicate (with a particular probability) that a particular memory segment contains an equivalent accessor. Although a bloom filter entry may be updated as a consequence of new accessors being added to or moved to a memory segment, the bloom filter cannot be updated when these accessors are moved from or removed from the memory segment. This is because the old version of the entry (excluding the accessor that is being removed) may not be known or kept. Hence, the entry for a given memory segment will eventually saturate (e.g. always indicate that an accessor is present) unless that entry is periodically rebuilt.

In some examples, the invalidation circuitry is adapted to rebuild the entry of the bloom filter that corresponds with the given memory segment by considering the associated validity indicator of each of the accessors in the given memory segment. In these examples, when the sweep occurs, the rebuilding of the entry of the bloom filter takes into account the validity indicator of each of the accessors. In particular, the bloom filter entry is not updated in respect of accessors that are considered to be invalid. This is because, being invalid, the accessors cannot be used.

In some examples, the entry of the bloom filter that corresponds with the given memory segment is rebuilt by performing a rewrite of those of the accessors that are in the given memory segment; and the invalidation circuitry is adapted to operate in a sweep mode of operation in which the rewrite is performed by inhibiting physically writing the accessor to the memory when the associated validity indicator indicates validity. In situations in which the instructions to create or copy a capability are also responsible for updating the relevant entry of the tracking circuitry, those same instructions can be used in order to recreate the bloom filter entry during a sweep. In these situations, a sweep mode of operation may be provided in which these instructions do not physically write the data back to the memory. This therefore saves memory bandwidth, since no memory write is actually being performed. Note that even though the data is not written back to memory using this technique, entries that are being invalidated will still have their (now invalid) validity indicator physically written to the memory. Furthermore, the bloom filter table entry is not updated to incorporate these entries, since they are now considered to be invalid.

In some examples, the invalidation circuitry is adapted, when the tracking circuitry indicates that a given memory segment contains one of the accessors, to sweep the given memory segment to determine the equivalent accessors. Having made the assessment that a memory segment may contain an equivalent accessor, it is necessary to scan the memory segment to locate the equivalent accessors (if they exist). In some embodiments, at the same time, the entry of the bloom filter that corresponds with the memory segment that is being swept is rebuilt. In particular, the full set of accessors that are located within the given memory segment can be used to recreate the entry of the bloom filter that is provided for the given memory segment. Note that the size of the memory segments affects the time that will be taken for the scan to occur. As previously described, the number of memory segments affects the amount of storage that is necessitated for the tracking circuitry. However, if fewer memory segments are provided (thereby making use of smaller tracking circuitry), then each memory segment is likely to be larger thereby resulting in a longer sweep time.

In some examples, the invalidation circuitry is adapted, when the tracking circuitry indicates that a given memory segment lacks each of the accessors, to refrain from sweeping the given memory segment. Where the tracking circuitry indicates that a given memory segment does not contain accessors, there is no need for the given memory segment to be swept to determine whether there are any equivalent accessors within that memory segment. Consequently, the tracking circuitry can be used in order to reduce the number of memory segments for which scanning is performed.

In some examples, the memory circuitry is further logically divided so as to comprise an active stack region; the tracking circuitry comprises a bit field to track the active stack region; and the tracking circuitry comprises a hash table or bloom filter to track the memory segments. In such a data processing apparatus, an active stack region is used in order for a currently active thread to store temporary data values. The nature of these data values is that they may be periodically modified, added and deleted. Such data values could include accessors. It will therefore be appreciated that for an active stack region, a bloom filter entry would rapidly saturate thereby regularly indicating that an equivalent accessor was present (even if it was not). Consequently, in these embodiments, a simpler bit field is used in order to indicate whether an accessor is present or not within the active stack region while at least some other areas of the memory are represented using hash table entries or bloom filter entries, due to those sections of the memory being less likely to saturate due to less frequent modifications being made.

In some other examples, the memory circuitry is further logically divided so as to comprise an active stack region; and the tracking circuitry is restricted from tracking the active stack region. In these examples, the tracking circuitry may simply be restricted from tracking the active stack region altogether. This may be made in recognition of the fact that it is likely that the tracking circuitry will always report the active stack region as containing an accessor. The active stack region may therefore always be swept for an equivalent accessor within reference to the tracking circuitry.

In some examples, the tracking circuitry is adapted to further track those of the accessors that are stored outside the memory segments. In these examples, simpler tracking can be used for areas of the memory outside the memory segments. In particular, a series of bits may be used, each corresponding with a different part of the memory that falls outside the memory segments, to indicate whether an accessor is located within that area of the memory.

Particular embodiments will now be described with reference to the figures.

FIG. 1 illustrates an example of a capability 100 (which is an example of the claimed accessor) in accordance with some embodiments. The capability is used in order to control access to a location in memory, which is provided via a pointer 130. In particular, the capability 100 includes metadata 120 that controls the way in which the pointer 130 can be used to access the memory 110. In this example, the metadata 120 includes a set of permissions 150. The permissions 150 indicate the manner in which the pointer can be used. For instance, the permissions 150 may indicate that the pointer 130 can be used for a read access to the memory 110. In such a case, an attempt to use the pointer 130 for a write access would fail, for instance, by causing an exception to be raised. The metadata 120 also includes bounds information 160, 170 in the form of a base address 160 and a limit address 170. These addresses collectively define a physical region 180 of the memory 110. The bounds information 160, 170 means that if the pointer 130 is used to access an address outside this region 180, then the request will fail by, for instance, an exception being raised. The capability 100 also includes a tag 150. In this example, the tag 140 is not part of the metadata 120. However, in other examples, the tag 140 may form part of the metadata 120. The tag 140 (which is an example of the claimed validity indicator), is used to indicate whether the capability 100 is valid and/or uncorrupted. For instance, the tag 140 could be set to '0' to indicate that the capability is invalid/corrupted whereas a '1' could indicate that the capability 100 is valid/uncorrupted.

Note that the bounds information 160, 170 can be expressed relative to the pointer, in which case the number of bits used to express the bounds information could be substantially smaller than the number of bits used to express the pointer. In this case, when a pointer is to be updated, it is first determined whether the updated pointer would lie within the old bounds (as calculated using the pointer and the relative boundaries). If not, then the capability is invalidated.

Both the pointer 130 and the metadata 120 may be accessible by a user application. However, an attempt to directly modify the metadata 120 causes the tag 140 to indicate that the capability has become invalid/corrupted. Some embodiments may permit the accessor's metadata to be legitimately modified using special instructions (e.g. that are used to reduce the bounds or remove permissions). However, the specifics of such an operation are beyond the scope of the present disclosure. Valid capabilities can be produced by special instructions (which may require a privileged mode of operation). Accordingly, capabilities can be used in order to protect access to memory. For instance, when a memory allocation request is serviced, a capability can be returned that defines the region of memory that has been allocated and provides a pointer 130 for accessing that region of memory. An attempt to use the pointer to access an area outside the region of memory will fail.

The capability can otherwise be treated as a regular data structure in the sense that it can be copied. For instance, the capability 100 is shown as having been copied to several locations 190a, 190b, 190c within the memory 110. However, this can cause a problem. In particular, when one of the capabilities 190a is to be invalidated, other copies of the capability 190b, 190c must also be located in order to be invalidated. If not, these copies could be used in order to access private information as illustrated with respect to FIGS. 2A and 2B. One way to locate the copies is by scanning the entirety of memory 110. However, this is time consuming and resource intensive. Accordingly, the present technique seeks to reduce the resources that are required in order to invalidate copies of equivalents of the capability to be invalidated.

Figures 2A, 2B:
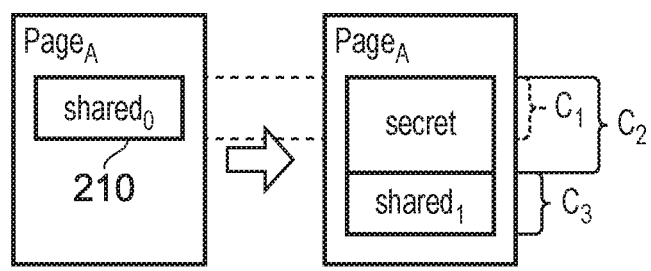
FIGS. 2A and 2B illustrate a manner in which a capability copy can be used in order to gain access to private information.

FIGS. 2A and 2B illustrate a manner in which a capability copy can be used in order to gain access to private information. In this example, a compartment A (which is the victim) calls a compartment B, which may take the form of an untrusted library (the attacker). Compartment A firstly creates a capability C1 that points to an allocated area of memory (shared$_0$). The compartment A then makes a function call to compartment B, passing in the capability C1. Within compartment B, the capability C1 is stored to the heap. The compartment B then performs the requested operation using the capability C1 as is expected. The compartment B then returns back to compartment A. Compartment A then frees the memory shared$_0$ pointed to by the capability C1. The "free" command only invalidates the capability C1 and so the copy that has been kept by compartment B is not invalidated. Instead, the copy that has been kept by compartment B remains a valid capability, which can be used to access the area of memory that was defined by shared$_0$ (which has now been freed). Compartment A now creates a second capability C2, which contains secret data. Due to the way in which memory allocation works, there is a reasonable chance that this memory allocation will use at least some of the memory that was previously allocated to shared$_0$. In particular, it is likely that capability C2 will refer to a region of memory that overlaps with capability C1. Compartment A then creates a further capability C3, describing the region shared$_1$. Compartment A then makes a second call to compartment B, this time passing the capability C3. If compartment B now uses its copy of capability C1, which was stored to the heap, then compartment B would in fact be accessing the area of memory that is referred to by capability C2, which includes the secret data. As illustrated in FIG. 2B, this is because the region of memory encompassed by capability C1 overlaps with the area of memory used to store the secret data via C2. In this particular example, it may be the case that compartment B is only able to access part of the secret data since the capability C1 only extends into part of C2. However, there may be situations where the reverse is true and the capability C1 not only covers C2 but also covers C3 as well. Note that throughout this process, none of the restrictions placed on capabilities are violated. In particular, it is legitimate for a capability to be copied provided that the metadata is not modified. Furthermore, since the invalidation of the capability C1 does not cause the copies of the capability to be invalidated, the copy of the capability C1 that is stored in compartment B's heap is not invalidated and so can continue to be used even though in practice the area of memory being referred to has been repurposed. The present technique seeks to resolve this problem.

Figure 3:
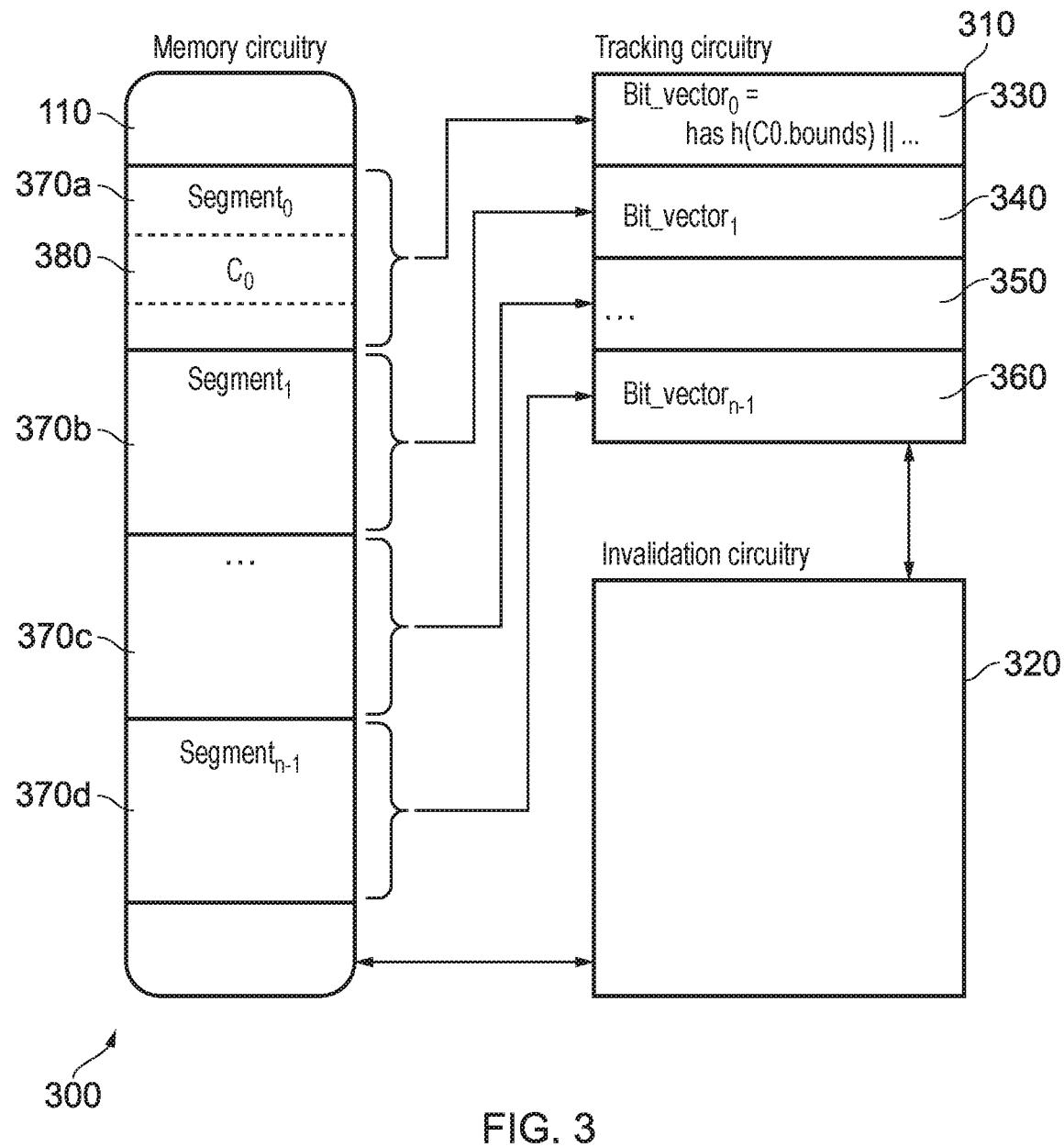
FIG. 3 illustrates a data processing apparatus in accordance with some embodiments.

FIG. 3 illustrates a data processing apparatus 300 in accordance with some embodiments. The data processing apparatus 300 includes memory circuitry 110, which defines a physical address space. At least part of this physical address space is logically divided into a number of segments 370a, 370b, 370c, 370d. In this example, a capability C0 380 is stored within one of the segments 370a. Tracking circuitry 310 is provided, which tracks whether a capability is stored within each of the segments 370a, 370b, 370c, 370d. In this example, the tracking circuitry 310 comprises a bloom filter. The bloom filter 310 provides a bit field made up of a number of bit vectors 330, 340, 350, 360. Each of the bit vectors 330, 340, 350, 360 corresponds with one of the segments 370a, 370b, 370c, 370d. Note that the logical divisions may or may not be consistently sized and the size of each segment can be chosen arbitrarily, e.g. at startup or at runtime by software.

The contents of each of the bit vectors 330, 340, 350, 360 are calculated by hashing the boundaries of each capability within the corresponding memory segment. For instance, if it is assumed that the only capability in the first segment 370a is the capability C0 380, then the corresponding bit vector 330 is produced by hashing the boundaries of capability C0 380. Each time a capability is added or moved to the first segment 370a, a hash of the boundaries of that capability is made and a logical OR is performed on the existing bit vector 330 corresponding with that segment 370a. Note that in the case of the bloom filter, no modification is made to the bit vectors 330, 340, 350, 360 as a consequence of a capability 380 being removed from the corresponding memory segment 370a. Consequently, over a number of additions (logical ORs), the bit vector 330 corresponding with the memory segment 370a will saturate. In other words, the corresponding bit vector 330 will become all 1s. This can be resolved by periodically rebuilding the bloom filter. The contents of the tracking circuitry are privileged and can therefore only be accessed in a defined manner—e.g. only by hardware or, in some embodiments, via a privileged mode into which the operating system can enter.

When an invalidation of a capability 380 is to be performed, invalidation circuitry 320 consults the tracking circuitry 310 to search for equivalent capabilities in the memory 300. Threads that are able to access the address space currently targeted by the revocation circuitry are halted until revocation completes. Also interrupts pertaining to software potentially able to access said address space are disabled. An equivalent capability cannot therefore be transferred into the part of the memory that has already been considered, which might cause a capability to be missed. In these examples, a hash of the capability 380 to be invalidated is made. The hash is then compared to each of the bit vectors 330, 340, 350, 360, which have themselves been produced by performing a logical OR of the hashes of capabilities stored within the corresponding memory segment. This comparison could be achieved by performing a logical AND operation between the hash of the boundaries of the capability 380 to be invalidated and the bit vector to be tested. If the result is equal to the hash of the boundaries of the capability 380 to be invalidated, then a hit has occurred on that entry of the tracking circuitry 310.

For instance, consider a situation in which a capability C1 is equivalent to a capability C0 if the boundaries of C1 fall within the boundaries of C0. This can be achieved by separately considering the upper and lower limits of each capability. For the upper limit, the least significant '1' and all lower bits, of the upper limit of each capability, are set to '1'. For instance, if the upper limit of C0 is 00001000 then this is hashed to 00001111 and if the upper limit of C1 is 00000100 then this is hashed to 00000111. A logical AND between these produces 00000111, which is equal to the hashed upper limit of C1. In other words, the upper limit of C1 is less than or equal to the upper limit of C0.

For the lower limit, the same operation can be performed by checking the result of the AND operation against C0 rather than C1. This shows whether C0 is less than or equal to C1, which implies C1 is greater than or equal to C0.

Since both conditions are met, the upper and lower limits of C1 are within the upper and lower limits of C0 and so C1 defines a sub-region of C0. Where the hash entry for a memory segment contains multiple capabilities, the upper and lower bounds of each capability are separately combined using logical ORs to provide a combined lower bounds and a combined upper bounds. Other hash algorithms will be known to the skilled person.

Note that the nature of a bloom filter is that even when a hit occurs, this does not guarantee that the entry is present. It is therefore necessary to search the corresponding memory segment in order to determine whether an equivalent capability is genuinely present. This can be achieved by sweeping through the relevant memory segment. For instance, if a hit occurs on an entry 350 of the tracking circuitry 310, then a sweep occurs on the corresponding memory segment 370c of the memory circuitry 110. Since it is expected that a hit may not occur in every entry 330, 340, 350, 360 of the tracking circuitry 310, it can be expected that certain segments 370a, 370b, 370c, 370d of the memory need not be swept and so the entire memory 110 need not be searched for corresponding capabilities.

Note that in this example, a bloom filter is used. However, in other examples, a smaller bit field can be used in order to indicate whether each memory segment 370a, 370b, 370c, 370d contains an accessor/capability or not. In particular, a '1' for a particular entry can be used to indicate that the corresponding memory segment 370a, 370b, 370c, 370d contains a capability whereas a '0' can be used to indicate that that memory segment 370a, 370b, 370c, 370d does not contain a capability. Such a data structure has the advantage that it is smaller than a bloom filter. However, this data structure lacks the ability to differentiate between different capabilities since the bounds information is not taken into account. Consequently, it is not possible for such a data structure to provide an indication of whether a capability having particular bounds is located within that memory segment and it is more likely that further analysis of the memory segment will be necessitated. Another option is to track the bounds of the capabilities within each memory segment. For instance, some embodiments might track the minimum base address and the maximum limit (e.g. top) address of each capability within that memory segment. Space can be saved in the tracking circuitry by discarding bits of these addresses (such as the least significant bits) or by tracking the hash of the maximum and minimum addresses. By tracking this additional information, it is less likely that a memory segment will be investigated more closely. A further way of tracking this information is for the tracking circuitry itself to record the bounds information of each capability within the memory segment—either the exact addresses, relevant bits, or a hash. This would decrease the probability of a false positive occurring. However, checking each entry in the tracking circuitry would take longer, and further storage space would be required for the tracking circuitry.

Although, in this example, the tracking circuitry 310 is shown as a distinct element, in other examples, the tracking circuitry could take the form of a series of instructions executing on a Central Processing Unit (CPU) for instance. In these embodiments, the operations associated with tracking could be instigated by, for instance, an operating system or hypervisor. Regardless of whether the tracking circuitry is a distinct unit or not, the data used by the tracking circuitry (the tracking data) could be stored within the memory hierarchy (e.g. in main memory) or could be stored in dedicated storage circuitry.

Figure 4:
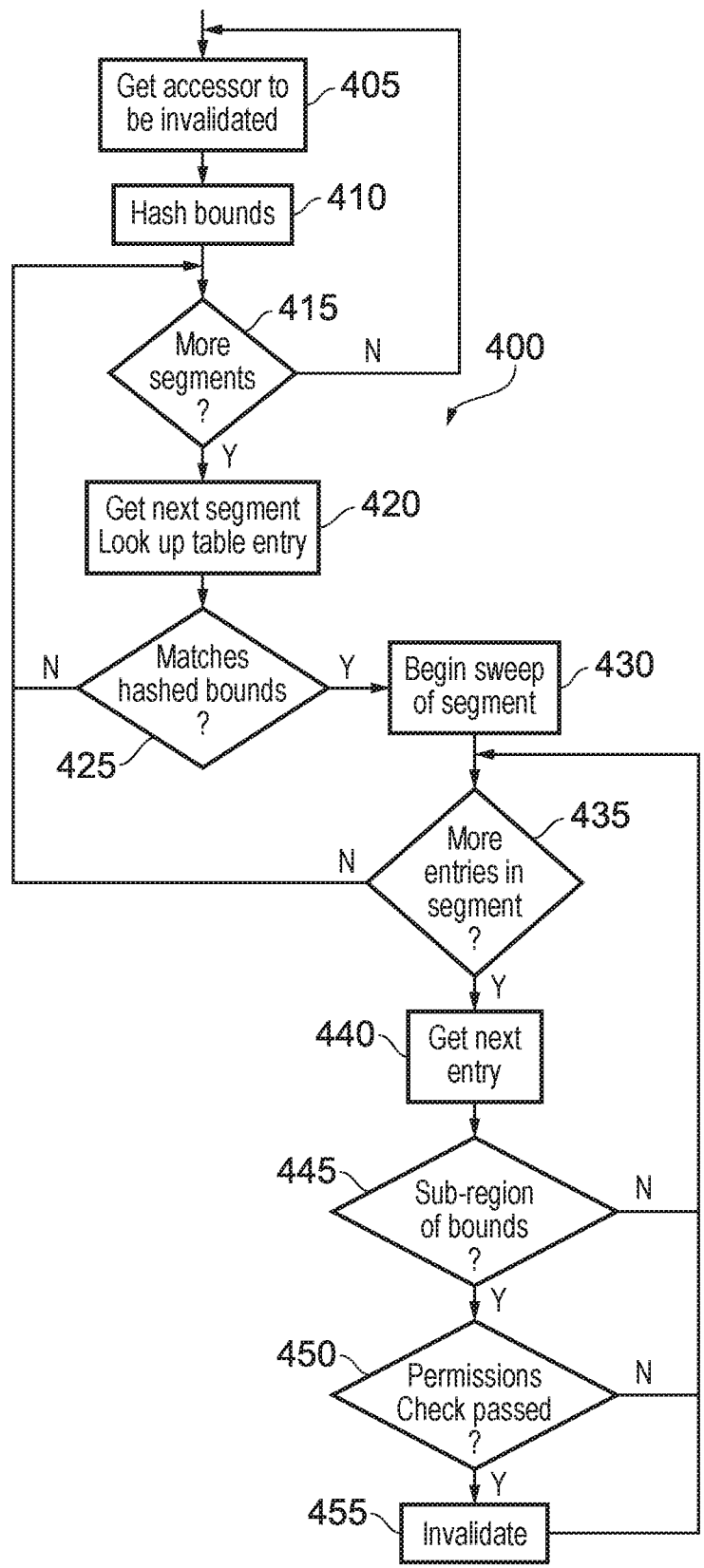
FIG. 4 illustrates a flow chart that shows a process of invalidating equivalent accesses in accordance with some embodiments.

FIG. 4 illustrates a flow chart 400 that shows a process of invalidating equivalent accesses in accordance with some embodiments. The process begins at a step 405 where an invalidation request is received in respect of a particular accessor. At a step 410, the boundaries defining the access to be invalidated are hashed. Then, at step 415, it is determined whether there are more entries in the tracking circuitry 310 to be considered. If not, then the scan of the tracking circuitry 310 is complete and the process restarts by returning to step 405 to await the next accessor to be invalidated. Otherwise, at step 420, the next entry of the tracking circuitry 310 is considered and at step 425, it is determined whether there is a hit against the hashed bounds that were calculated in step 410. If not, then the process returns to step 415 to consider any further entries in the tracking circuitry 310. Otherwise, the process proceeds to step 430 where the memory segment corresponding with the entry that hit is swept. In particular, step 435 determines whether there are more entries in the segment to be swept to be considered. Such an entry could consist of a byte or could consist of a block of the memory equal in size to that of the accessor (e.g. capability). For instance, if a capability is 128 bits in length, then the entries that are considered may be a multiple of 128 bits such that a capability will not be spread across a plurality of the entries. If there are no more entries to be considered, then the process returns to step 415. Otherwise, the process proceeds to step 440 where the next entry of the memory segment is obtained. Step 445 considers whether the entry being considered is an accessor representing a sub-region of the bounds of the accessor to be invalidated. If not, then, in this example, the entry being considered is not an equivalent accessor and so the process returns to step 435. Otherwise, the process proceeds to step 450 where it is determined whether there is equivalence between the permissions of the accessor to be invalidated and the current entry of the memory segment. This might occur if the permissions match or if one set of permissions is a subset of the permission of the other. If not, then in this example, the accessors are not considered to be equivalent and so the process returns to step 435. Otherwise, the accessors are considered to be equivalent and the accessor in the current entry is invalidated in step 455 before the process returns to step 435.

Checking the permissions makes it possible to revoke a write capability to a region that is also covered by a read capability or an execute capability (for instance), which are not to be invalidated.

Accordingly, each of the entries of the tracking circuitry is tested for a hit. Where a hit occurs, the memory segment corresponding with the entry that hit is swept. Each entry within the memory segments that hit is tested to determine whether they are equivalent accessors or not. In this example, an accessor is considered to be equivalent if (a) it refers to a sub-region of the boundaries defined by the accessor to be invalidated and (b) the permissions are identical. In other examples, other tests can be provided in order to test equivalence. For instance, the two regions may have to be identical. In some examples, the permissions need not match, or the permissions of one accessor would only be required to be a subset of the permissions of another accessor. Further tests could also be added. In particular, this example does not explicitly require that the validity tag of an accessor to be tested is set. However, there is no need to invalidate an accessor that is already invalid and consequently a further test that could be carried out is for whether a particular entry contains a currently valid accessor or not. If the accessor to be tested is not valid, then non-equivalence is assumed.

As previously explained, a bloom filter can be used in order to provide a probabilistic determination as to whether a particular memory segment contains an equivalent accessor to an accessor to be invalided. In particular the bloom filter is populated using a hash of accessor parameters that define equivalence (e.g. bounds and/or permissions). However, since a bloom filter is populated by performing a logical OR between a hash to be added to an entry of a bloom filter and the current value of the bloom filter, it is very difficult to update an entry of the bloom filter in order to represent a capability being removed. Accordingly, after numerous additions and removals, a bloom filter entry might always hit even if there are no capabilities remaining within the corresponding memory segment. One way in which this situation can be resolved is for the entry of a memory segment to be periodically rebuilt, taking into account the current valid entries within the corresponding memory segment and disregarding those entries that are invalid.

Figure 5:
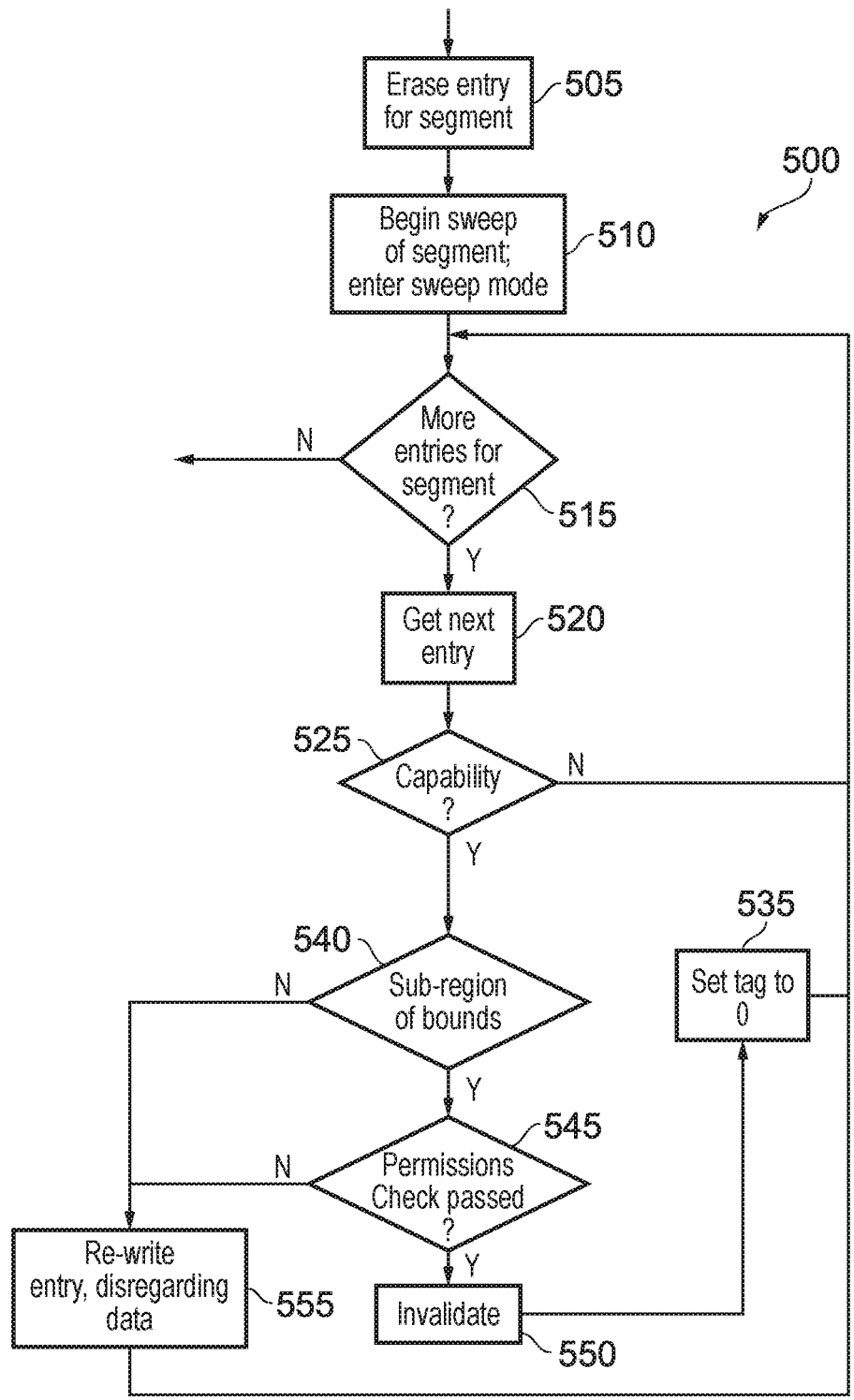
FIG. 5 illustrates a flow chart that shows a process of rebuilding a bloom filter entry in accordance with some embodiments.

FIG. 5 illustrates a flow chart 500 that shows a process of rebuilding a bloom filter entry for a memory segment when a hit occurs on the corresponding bloom filter entry. The steps 505 to 555 can be used as a replacement for steps 430 to 455 shown in FIG. 4. The process illustrated with respect to FIG. 5 makes use of a 'sweep mode' of operation, which allows existing write mechanisms to be repurposed in order to perform a rebuild of a bloom filter table entry. In particular, this process assumes that when a capability is written to memory, the instruction that performs the write also updates the tracking circuitry.

The process begins at a step 505 when a hit occurs on a particular entry of the bloom filter. At step 505, the corresponding entry of the bloom filter for which a hit occurred is erased. At a step 510, a sweep of the corresponding memory segment begins. This also initiates a 'sweep mode' of operation for the invalidation circuitry. At a step 515, it is determined whether there are more entries for the segment being considered. If not, then the process returns to considering whether other memory segments might hit. For instance, this may cause a return to step 415 shown in FIG. 4. If there are more entries, then at step 520, a next entry in the memory segment is considered. At a step 525, it is determined whether the entry in the memory segment is a capability. If not, then the process returns to step 515. At step 540, it is determined whether this capability defines a sub-region of the boundaries defined by the capability to be invalidated. If not, the process proceeds to step 555, discussed below. If so, then at step 545 it is determined whether there is equivalence between the permission, as previously described (e.g. a match or a subset in some embodiments). If not, then the process proceeds to step 555. Otherwise, the process proceeds to step 550 where the capability is invalidated due to it being considered to be an equivalent capability. The process then proceeds to step 535 where the validity tag is set for the capability to indicate that the capability is invalid. At step 555, a rewrite of the data is performed. Again, the process of rewriting the data is achieved using the existing write mechanism, which because of the sweep mode being engaged, does not actually require the data to be physically rewritten back to memory. This makes it possible to use the write mechanism's existing process for updating the bloom filter table entry. However, in this situation, there is no need for the data to actually be written to memory since the data for the capability is already in the memory. Accordingly, although the write mechanism is invoked, no data is physically written to the memory and the existing contents of the memory location remain the same. This makes it possible to re-use the existing mechanism while reducing an impact on memory bandwidth since the data need not be provided for a write process to occur. Having performed the re-write, the process returns to step 515.

As a consequence of the sweep mode, the amount of data that is physically written is reduced. In particular, where an entry is invalidated, only the tag needs to be written. In other cases, no data is actually written, and the write mechanism is merely used to update the filter.

Figure 6:
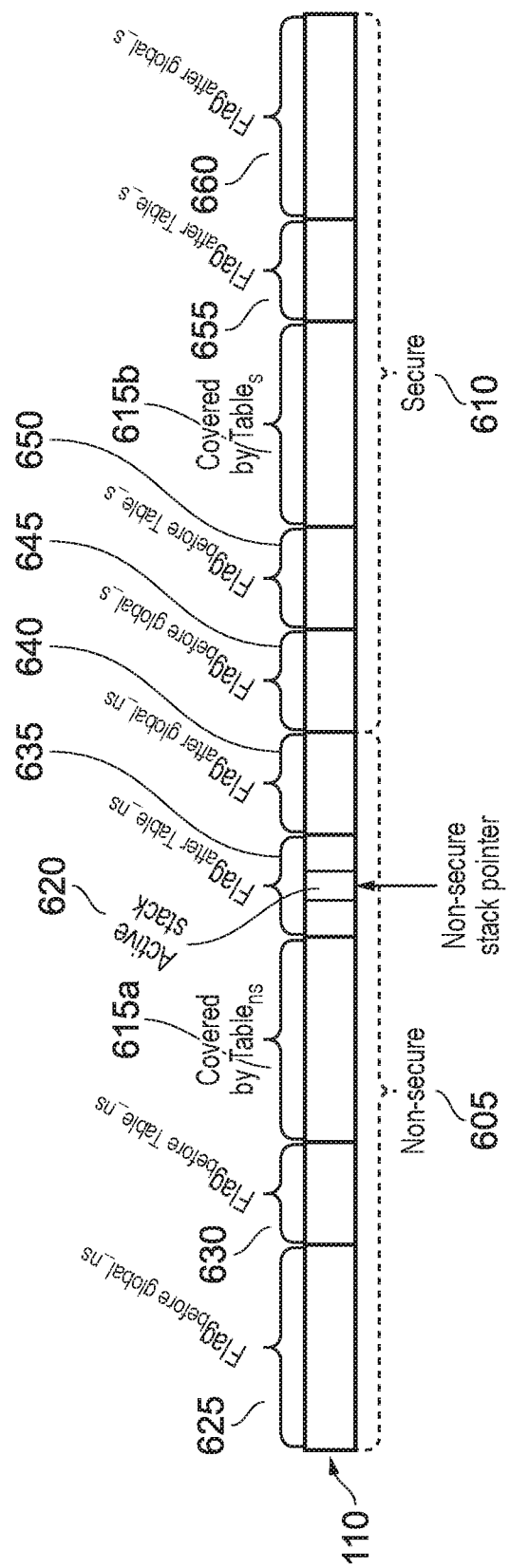
FIG. 6 illustrates a number of improvements that can be made to the presently described technique in accordance with some embodiments.

FIG. 6 illustrates a number of improvements that can be made to the presently described technique. In particular, the address space provided by the memory 110 could be divided into non-secure memory 605 and secure memory 610. Different tracking tables (e.g. bloom filter tables) can be provided for a first section of the memory 615a in the non-secure memory 605 and a second section of the memory 615b in a secure section of the memory 610. This can be used in order to help the isolation of non-secure memory 605 and secure memory 610.

It will be appreciated that as illustrated in FIG. 6, not all of the memory need be covered by a table of the tracking circuitry 310. For instance, considering the non-secure memory 605, part of the memory 615a is covered by a bloom filter table, while other sections 625, 630, 635, 640 of the memory merely use a flag in order to indicate whether that section of the memory contains an accessor/capability or not. The use of a flag, as opposed to a bloom filter, could be appropriate where it is either extremely unlikely that the section of memory will contain a capability (and therefore detailed reporting is unnecessary), or in which capabilities are frequently added and removed such that saturation of the relevant bloom filter entry is probable. This latter situation is particularly likely in the case of an application stack, which is a data structure used to temporarily store data values during the operation of a particular threat.

The above description illustrates how multiple tables can be provided for multiple security domains. However, there are other ways in which the memory space can be managed so as to avoid the tracking circuitry tracking the entire address space. In some embodiments, the tracking circuitry could provide one table (e.g. a bloom filter table) for each different thread or privilege level. The table to be searched can then be switched as the thread changes. Consequently, the amount of memory to be searched can be reduced to only being the area of memory relevant to the current thread, which allows for finer granularity tracking to occur. Where capabilities are shared between threads, it is necessary to check not only the current bloom filter table (for the current thread) but also the tables relating to threads that can share the capability. In some embodiments, one table can be provided for each Memory Protection unit (MPU).

In the previous description, it is assumed that each entry in the tracking circuitry is considered to determine which entries 'hit'. For each 'hit', a corresponding memory segment is then searched to discover equivalent accessors/capabilities. In other embodiments, the minimum and maximum addresses of the address space that are allocated to a thread are tracked for that thread. When an invalidation occurs, only those entries that correspond to memory segments falling within the minimum and maximum limits are considered. In this way, memory segments for which no allocations have occurred are 'skipped'. In some embodiments, the memory allocations themselves are tracked. Other embodiments could track the minimum and maximum addresses of capability stores so that only those areas of memory containing capabilities are considered. Still other embodiments could consider only those entries in valid MPU regions.

During runtime, the amount of memory to be tracked could change, and this can be compensated for. One way to do this is to use the above system of 'flags' for areas outside the main tracked region(s) of memory. A further possibility is to extend the table (providing sufficient storage is available) to store more entries. If further storage is not available, it is possible to compensate by increasing the 'segment size', e.g. the size of each memory region covered by an entry in the tracking circuitry.

In terms of updating the tracking circuitry, a buffer can be provided to store frequently accessed entries in the tracking circuitry. This is especially beneficial if the data structure used by the tracking circuitry otherwise has a long latency (e.g. if it is stored in main memory). A further possibility is to include an in-memory update instruction. Such an instruction would acquire a value in the memory, perform an operation (such as a logical OR operation between the value in memory and a further value) and write the result back to memory. In this way, an update to the tracking circuitry's data can be performed without the data having to be retrieved from memory, operated upon, and written back in a series of memory transactions that would be time consuming.

Figure 7:
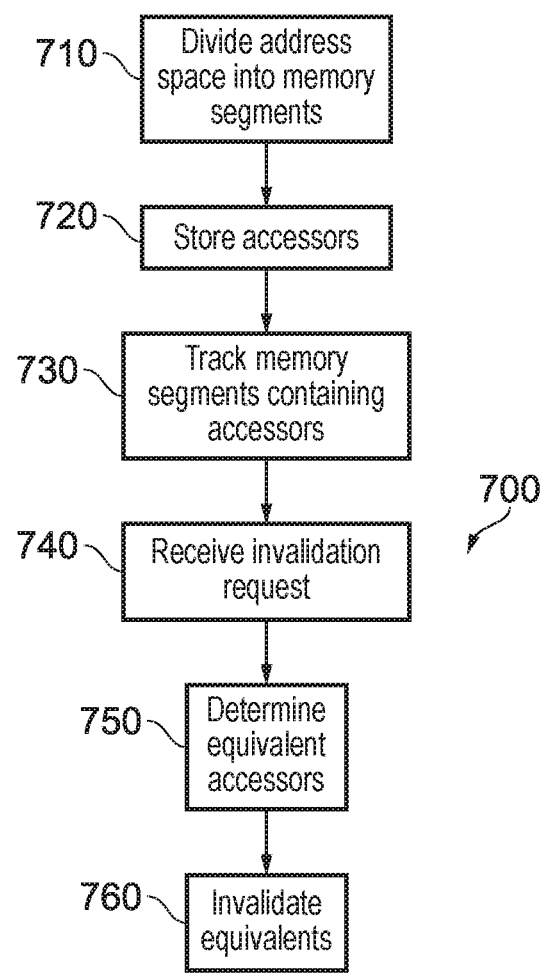
FIG. 7 illustrates a flow chart that shows a process of data processing in accordance with some embodiments.

FIG. 7 illustrates a flow chart 700 that shows a process of data processing in accordance with some embodiments. At a step 710, an address space is provided into memory segments. There is no obligation for the address space to be exactly divided into memory segments and there may be sections of the address space that fall outside of memory segments. At a step 720, one of more accessors used for accessing particular regions of the address space are stored. At step 730, tracking is performed on the memory segments to determine whether particular memory segments contain accessors. This can be achieved by adding the tracking capability to instructions that perform capability operations. For instance, instructions that are provided to create or copy capabilities can be extended in order to update tracking circuitry 310. At a step 740, an invalidation request is received for one of the accessors. At a step 750, equivalent accessors are determined with reference to the tracking circuitry that is used to perform the tracking at step 730. Having determined the equivalents, at step 760, those equivalent accessors are then invalidated.

By using the tracking circuitry in this way, it is not necessary in many situations for the entirety of the memory's address space to be searched for equivalent accessors. Instead, it is possible to use the tracking circuitry to limit a section of the memory that needs to be searched, thereby reducing the resource intensiveness of a process that is performed for invalidating equivalent accessors. By invalidating equivalent accessors in this manner, it is possible to restrict unauthorised access to areas of memory in a resource-efficient manner.

Figure 8:
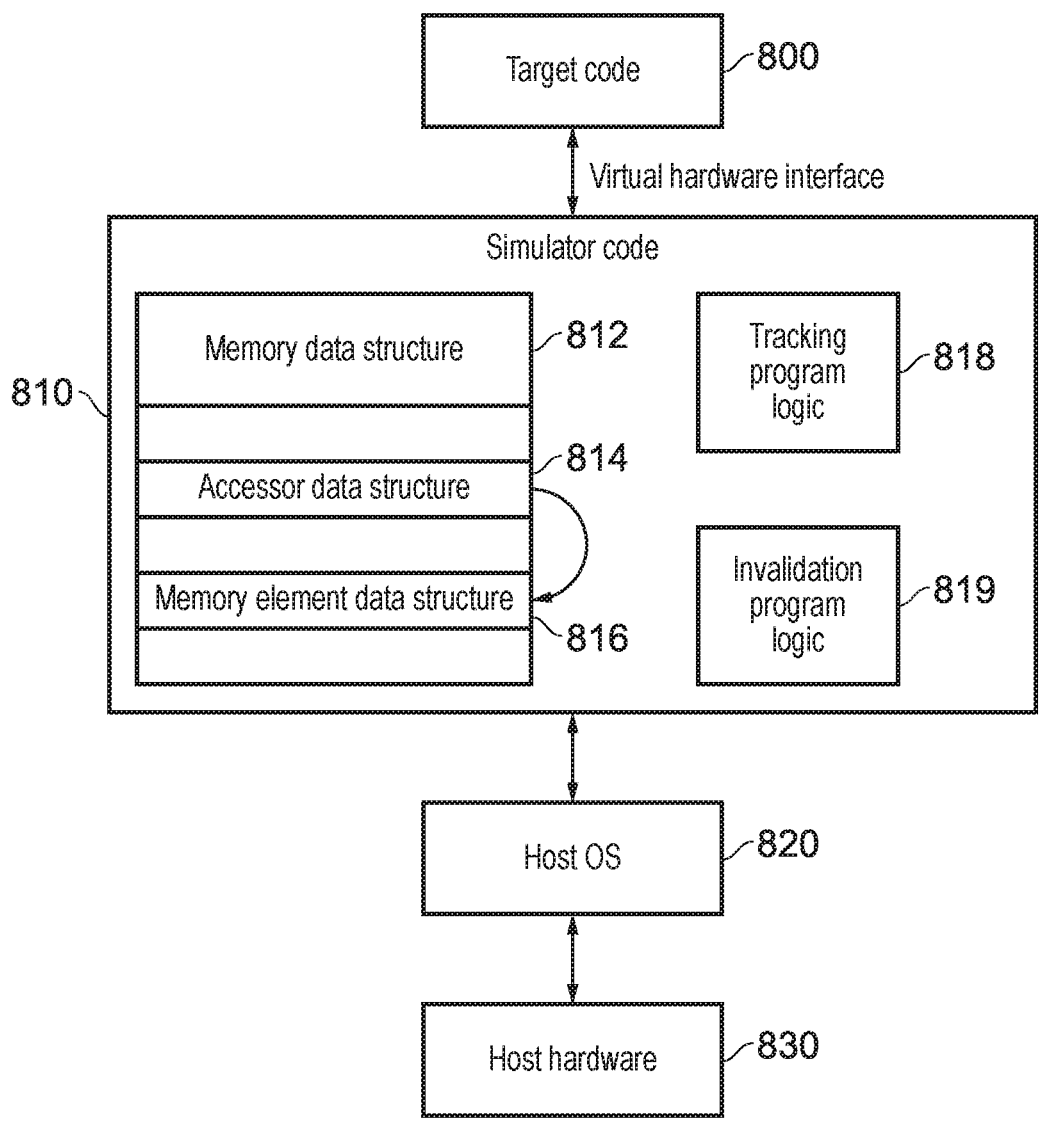
FIG. 8 illustrates a simulator implementation that may be used in accordance with some embodiments.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 830, optionally running a host operating system 820, supporting the simulator program 810. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 830), some simulated embodiments may make use of the host hardware, where suitable.

The simulator program 810 may be stored on a computer-readable storage medium (which may be a non-transitory medium), and provides a program interface (instruction execution environment) to the target code 800 (which may include applications, operating systems and a hypervisor) which is the same as the interface of the hardware architecture being modelled by the simulator program 810. Thus, the program instructions of the target code 800, may be executed from within the instruction execution environment using the simulator program 810, so that a host computer 830 which does not actually have the hardware features of the apparatus 300 discussed above can emulate these features.

In this example, the simulator program 810 makes use of a memory data structure 812 to emulate a memory, which can be accessed by the target code 800. The memory data structure 812 includes one or more accessor data structures 814, which may be created and/or used by the target code 800, and which are used to access memory elements 816 in the memory data structure 812. Again, the memory elements 816 could be created and/or used by the target code 800. The simulator program 810 also includes tracking program logic 818 that emulates the functionality of the tracking circuitry 810 discussed in relation to FIG. 3, and which tracks the use of accessor data structures 814 in the memory data structure 812. In addition, the simulation 810 makes use of invalidation program logic 819 to invalidate equivalent accessor data structures 814 in the memory data structure 812.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
   memory circuitry to provide a physical address space logically divided into a plurality of memory segments and to store a plurality of accessors with associated validity indicators, wherein each of the accessors controls access to a region of the physical address space in dependence on at least its associated validity indicator;
   tracking circuitry to track which of the memory segments contain the accessors; and
   invalidation circuitry to respond to a request to invalidate an accessor by determining a set of equivalent accessors with reference to the tracking circuitry, and to invalidate the accessor and the equivalent accessors by setting the associated validity indicator of each of the accessor and the equivalent accessors to indicate that the accessor and the equivalent accessors are invalid.

2. The data processing apparatus according to claim 1, wherein the equivalent accessors comprise those of the accessors that control access to the region of the physical address space.

3. The data processing apparatus according to claim 1, wherein
the accessor comprises a pointer.

4. The data processing apparatus according to claim 3, wherein
the accessor comprises bounds information that defines the region of the physical address space that the pointer can be used to access.

5. The data processing apparatus according to claim 4, wherein
the equivalent accessors comprise those of the accessors where the bounds information matches that of the accessor.

6. The data processing apparatus according to claim 4, wherein
the equivalent accessors comprise those of the accessors where the bounds information defines a sub-region of the region of the physical address space.

7. The data processing apparatus according to claim 1, wherein
the tracking circuitry is adapted to indicate whether each of the memory segments contains one of the accessors.

8. The data processing apparatus according to claim 1, wherein
the tracking circuitry comprises a bit field comprising a plurality of bits; and
the plurality of bits is adapted to indicate which of the memory segments contains one of the accessors.

9. The data processing apparatus according to claim 1, wherein
the tracking circuitry comprises a hash table; and
the hash table accepts, as an input, a hash of at least part of the accessor.

10. The data processing apparatus according to claim 1, wherein
the tracking circuitry comprises a bloom filter.

11. The data processing apparatus according to claim 10, wherein
the invalidation circuitry is adapted, when the tracking circuitry indicates that a given memory segment contains one of the accessors, to perform a sweep of the given memory segment and rebuild an entry of the bloom filter that corresponds with the given memory segment.

12. The data processing apparatus according to claim 11, wherein
the invalidation circuitry is adapted to rebuild the entry of the bloom filter that corresponds with the given memory segment by considering the associated validity indicator of each of the accessors in the given memory segment.

13. The data processing apparatus according to claim 11, wherein
the entry of the bloom filter that corresponds with the given memory segment is rebuilt by performing a rewrite of those of the accessors that are in the given memory segment; and
the invalidation circuitry is adapted to operate in a sweep mode of operation in which the rewrite is performed by inhibiting physically writing the accessor to the memory when the associated validity indicator indicates validity.

14. The data processing apparatus according to claim 1, wherein
the invalidation circuitry is adapted, when the tracking circuitry indicates that a given memory segment contains one of the accessors, to sweep the given memory segment to determine the equivalent accessors.

15. The data processing apparatus according to claim 1, wherein
the invalidation circuitry is adapted, when the tracking circuitry indicates that a given memory segment lacks each of the accessors, to refrain from sweeping the given memory segment to determine the equivalent accessors.

16. The data processing apparatus according to claim 1, wherein
the memory circuitry is further logically divided so as to comprise an active stack region;
the tracking circuitry comprises a bit field to track the active stack region; and
the tracking circuitry comprises a hash table or bloom filter to track the memory segments.

17. The data processing apparatus according to claim 1, wherein
the memory circuitry is further logically divided so as to comprise an active stack region; and
the tracking circuitry is restricted from tracking the active stack region.

18. The data processing apparatus according to claim 1, wherein
the tracking circuitry is adapted to further track those of the accessors that are stored outside the memory segments.

19. A data processing method comprising:
logically dividing a physical address space of a memory into a plurality of memory segments;
storing a plurality of accessors with associated validity indicators, wherein each of the accessors controls access to a region of the physical address space in dependence on at least its associated validity indicator;
tracking which of the memory segments contain the accessors;
responding to a request to invalidate an accessor by determining a set of equivalent accessors with reference to the tracking circuitry; and
invalidating the accessor and the equivalent accessors by setting the associated validity indicator of each of the accessor and the equivalent accessors to indicate that the accessor and the equivalent accessors are invalid.

20. A non-transitory computer-readable storage medium comprising a computer program for controlling a host data processing apparatus to provide an instruction execution environment comprising:
a plurality of data structures to store a plurality of accessors with associated validity indicators, wherein each of the accessors controls access to one of the data structures in dependence on at least its associated validity indicator;
tracking program logic to track which of the data structures contain the accessors; and
invalidation program logic to respond to a request to invalidate an accessor by determining a set of equivalent accessors with reference to the tracking program logic, and to invalidate the accessor and the equivalent accessors by setting the associated validity indicator of each of the accessor and the equivalent accessors to indicate that the accessor and the equivalent accessors are invalid.

* * * * *